United States Patent Office 3,433,583
Patented Mar. 18, 1969

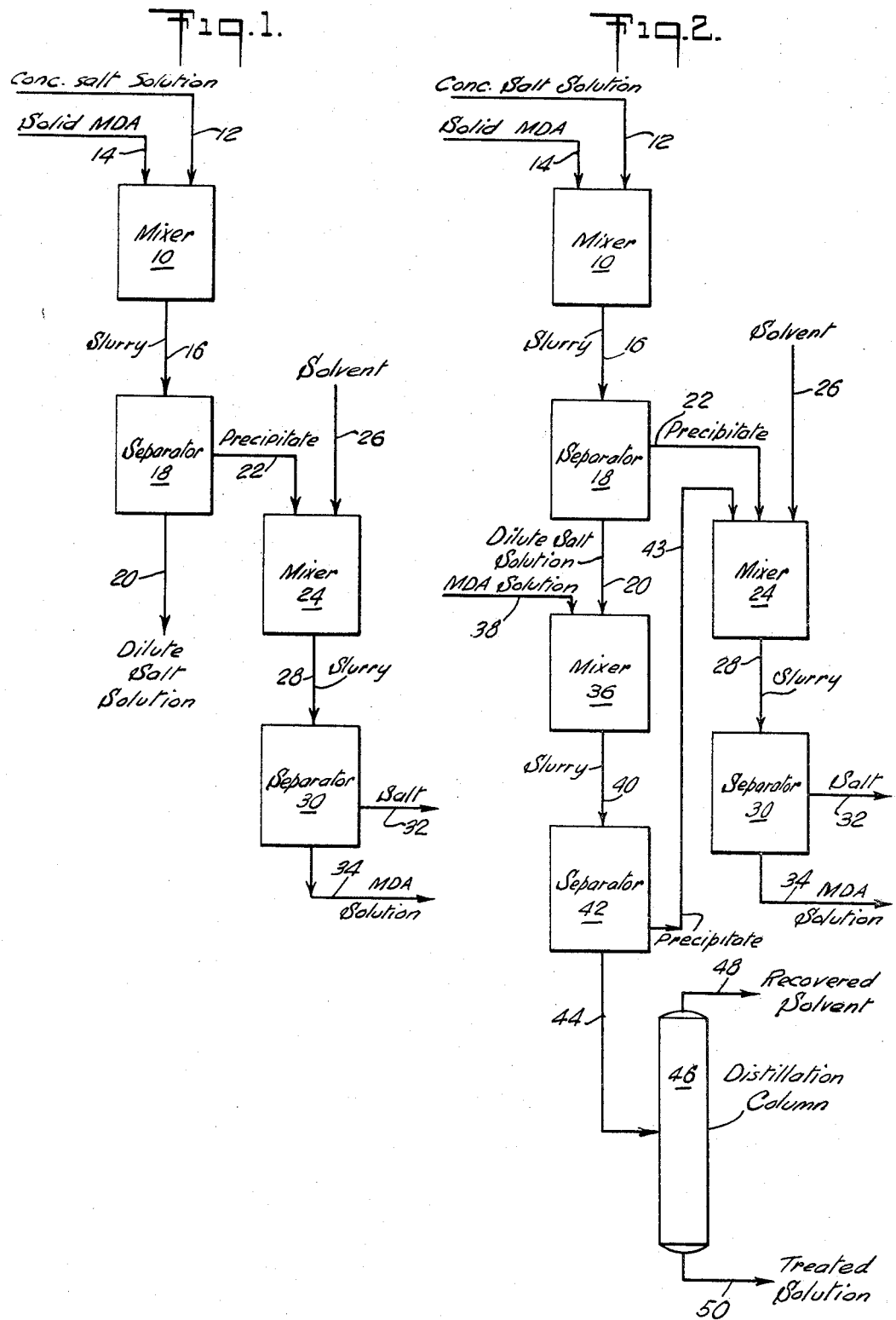

3,433,583
PROCESS FOR REMOVAL OF SALTS FROM AQUEOUS SOLUTIONS WITH SOLID METHYLENEDIANILINE
Howard V. Hess, Glenham, and Frederic C. McCoy, Beacon, N.Y., assignors to Texaco Inc., New York, N.Y., a corporation of Delaware
Filed June 28, 1967, Ser. No. 649,535
U.S. Cl. 23—89                7 Claims
Int. Cl. C01d 3/12, 3/10, 3/04

ABSTRACT OF THE DISCLOSURE

A process for removing certain sodium and lithium salts from concentrated aqueous solutions in the form of insoluble precipitates by reacting said salts with solid 4,4'-methylenedianiline.

CROSS-REFERENCE TO RELATED APPLICATIONS

In copending patent application Ser. No. 649,480, filed concurrently herewith, there are disclosed compositions of matter prepared in accordance with the process of the present invention. In copending application Ser. No. 649,553, filed concurrently herewith, there is disclosed a modification of the invention wherein methylenedianiline dissolved in an organic solvent having a mutual solubility for both water and methylenedianiline is reacted with aqueous solutions of certain sodium and lithium salts.

BACKGROUND OF THE INVENTION

Field of the invention

The present application relates to a process for the removal of certain sodium and lithium salts from their concentrated aqueous solutions.

Description of the prior art

The recovery of mineral values from natural and synthetic brines is an operation of current commercial significance and one which promises to become increasingly important as a source of certain mineral values. Solution mining, the processing of brines from the so-called salt lakes of the world, and, in some instances, the processing of oil field brines can provide huge quantities of valuable minerals. For example, solution mining of soluble mineral deposits, particularly potassium chloride deposits, is of considerable commercial importance. Usually potassium chloride occurs in underground mineral deposits in admixture with sodium chloride. Of particular interest now for solution mining are the deposits of potassium chloride and sodium chloride in Canada and in the southwestern parts of the United States. The Canadian deposits are often too deep for economic mining by conventional mining methods. On the other hand, some of the potash deposits in the Carlsbad, N. Mex. area are of insufficient thickness to be economically mined by conventional mining procedures. In either case, solution mining appears to offer promise of economic recovery of the potassium chloride from the underground deposits.

One of the problems involved in solution mining is the separation and recovery of the potassium chloride from the associated sodium chloride after the solution has been brought to the surface of the earth. Conventionally, the water may be removed and the salts crystallized from the brine by evaporation of the water, for example, by a series of large multiple effect vacuum evaporators or by means of vast pools which utilize solar heat for evaporation. In either event, such installations require a very large capital investment. The present invention makes possible to a considerable degree the separation of sodium, and potassium salts in relatively concentrated solutions with a more reasonable capital investment.

We have discovered that sodium and lithium salts may be precipitated from an aqueous solution by reaction with 4,4'-methylenedianiline (also referred to hereinafter as MDA) and that MDA does not react with any potassium compounds to produce a precipitate. This property of MDA to react only with sodium and lithium salts is of prime importance in making possible the process of the present invention wherein the MDA is caused to react selectively with the sodium and lithium salts.

SUMMARY OF THE INVENTION

The present invention concerns a process whereby an aqueous solution or brine containing in excess of about 12 percent of one or more sodium or lithium salts, for example, the chlorides, bromides, iodides and nitrites is reacted at a temperature of the order of 85–96° C. with solid 4,4'-methylenedianiline. A precipitate formed by interaction of the salt and MDA is removed, leaving a treated liquid of substantially reduced salt content. The precipitate, which has a 3:1 mol ratio of MDA to salt, is decomposed into its original constituents by adding a suitable oragnic solvent, e.g., an alcohol, ketone, ether, etc. at an elevated temperature in the range of about 40 to 100° C., depending on the volatility of the solvent. The salt content of the precipitate may be recovered for mineral values and the solvent from the step of decomposing the precipitate may be recovered and reused in the process. If desired, the treated water, which usually contains about 12 percent of unremoved salts may be further treated by means of the process of our patent application Ser. No. 649,533, filed concurrently herewith.

The term "concentrated brine" is used herein to denote aqueous solutions of inorganic salts in concentrations ranging from a minimum of about 12 percent to saturation. The types of brines to which the process may be applied include aqueous solutions of dissolved sodium and lithium salts, for example, the chlorides, bromides, iodides and nitrites. In addition to sodium and lithium salts, however, natural brines and solution mining brines usually contain other salts, such for example as salts of potassium, calcium, magnesium and the like, which do not form precipitates with 4,4'-methylenedianiline. Typical brines include the natural brines of the so-called salt lakes, as the Great Salt Lake of Utah and the synthetic brines obtained from wells by solution mining techniques. With such brines there results a selective reaction of the methylenedianiline with the sodium and lithium salts in preference to the salts of the other metals present. Under some circumstances the surface of the MDA may be wet with benzene, or similar solvent, before being added to the salt solution. Under such circumstances, the reaction may be carried out at substantially room temperature.

BRIEF DESCRIPTION OF THE DRAWINGS

For a more complete understanding of our invention reference may be had to the following description and claims, taken in conjunction with the accompanying drawings in which like parts are designated by like reference characters and in which:

FIGURE 1 is a schematic flow diagram illustrating a process for treating a concentrated salt solution with solid methylenedianiline in accordance with the invention, and FIGURE 2 is a schematic flow diagram illustrating a process for treating a concentrated salt solution as shown in FIGURE 1 and further treating the aqueous product therefrom with a solution of MDA. Neither of these illustrations however is intended to be limiting in scope.

DESCRIPTION OF THE PREFERRED EMBODIMENTS

Detailed description of the drawings

With reference to FIGURE 1, a concentrated aqueous salt solution such as may be obtained from the solution mining and containing sodium or lithium chlorides, bromides, iodides, or nitrites, or charged to mixer 10 by means of line 12. Solid crystalline 4,4'-methylenedianiline (MDA) is also charged to mixer 10 through line 14. The aqueous salt solution and solid MDA are mixed together in mixer 10 at a temperature in the neighborhood of 85–90° C. Under these conditions the MDA reacts with the sodium chloride to form a crystalline precipitate consisting essentially of MDA and salt in approximately a 3:1 mol ratio. The resulting slurry is then discharged through line 16 into liquid-solid separator 18 where the solid precipitate consisting of sodium or lithium salts and MDA is separated from the mother liquor. Separator 18 optionally may be a filter settler and decantation tank, classifier, centrifuge or any other device suitable for separating liquids from solids. The mother liquor consisting essentially of treated salt solution of reduced salt content is discharged from separator 18 through line 20. The dilute salt solution from separator 18 ordinarily contains in the neighborhood of 12 percent of sodium or lithium salts. This dilute salt solution may be subjected to the usual selective crystallization or other methods for recovery of potassium or other mineral valves with greater ease than the original solution due to the reduced sodium or lithium content or it may be further processed as shown in FIGURE 2.

In the salt recovery portion of the process, the MDA-salt precipitate from separator 18 is discharged through line 22 into mixer 24 where it is mixed at an elevated temperature in the range of 40–100° C. with a solvent for the MDA. Suitable solvents include ketones, alcohols, ethers, etc. The solvent is supplied to mixer 24 through line 26. Under the conditions in mixer 24 the MDA-salt precipitate which is crystalline in nature is broken down into its component parts and the contents of mixer 24 are then discharged by way of line 28 into liquid-solid separator 30 where the salt is removed as a solid through line 32. The MDA is withdrawn from separator 32 through line 34 in the form of a solution in the solvent added to mixer 24 through line 26.

In the embodiment shown in FIGURE 2 the dilute salt from separator 18 is fed through line 20 to mixer 36 where it is mixed with a solution of 4,4'-methylenedianiline (MDA) in a solvent, e.g., acetone or methanol, charged to mixer 36 through line 38. The dilute salt solution and MDA solution are brought together in mixer 36 at a temperature in the neighborhood of 20° C. and a crystalline precipitate is obtained which consists essentially of MDA and the MDA reactive sodium or lithium salts present in the dilute salt solution in approximately a 3:1 mol ratio. The resulting slurry is discharged through line 40 into separator 42. The MDA-salt precipitate formed in mixer 36 is separated from the aqueous phase in separator 42 and discharged through line 43 to mixer 24 where it is mixed with precipitate from separator 18 and resolved into its components as described in connection with FIG. 1. The aqueous phase from separator 42 contains solvent from the original MDA solution added through line 38 and is discharged from separator 42 through line 44 to distillation column 46 where the solvent content is distilled overhead and recovered through line 48. The aqueous phase is withdrawn from distillation column 46 as a bottoms stream through line 50 and contains most of the potassium, calcium, magnesium and other nonreacting salts originally present in the concentrated salt solution charged to the process but the amount of sodium or lithium salts which react with MDA has been substantially reduced during the processing operation. The MDA treated solution withdrawn through line 50 may be subjected to the usual selective crystallization or other methods for recovery of potassium and other mineral valves with greater ease than the original solution due to reduced sodium and lithium content.

Salts which form insoluble precipitates when treated with MDA in concentrated solutions are the chlorides, bromides, iodides, and nitrites of sodium and lithium. Other salts of sodium and lithium which do not react to form precipitates are the fluorides, nitrates, thiocyanates, acetates, sulfates and carbonates. The fluorides, chlorides, bromides, iodides, nitrates, and nitrites of potassium do not form precipitates with solid MDA. Calcium chloride and magnesium chloride in concentrated solutions also do not react with solid MDA to yield precipitates.

The process shown diagrammatically in FIGURE 1 may be used for the removal of MDA reacting salts from their concentrated solutions either when present alone or in association with other MDA reacting salts or non-reacting salts. The following example describes the removal of sodium chloride from a concentrated aqueous solution of this salt.

A concentrated sodium chloride brine containing 20% by weight NaCl is mixed with 800 grams of solid MDA per liter of brine in mixer 10 at a temperature of 70–75° C. A crystalline precipitate is formed and the resulting slurry is fed to separator 18 where the precipitate is removed from the aqueous phase, as by filtration. The aqueous phase is withdrawn from separator 18 as a less concentrated sodium chloride solution containing approximately 12% by weight NaCl. The precipitate from separator 18 is transferred to mixer 24 where it is resolved into its component parts by addition of 2–3 ml. of a suitable solvent such as acetone, methyl alcohol, etc. per gram of precipitate. Sodium chloride is recovered from the MDA solution in separator 30. Alternatively, if desired, the precipitate may be resolved into its component parts by heating to a temperature above its melting point, e.g., about 200° C. or higher. The salt can then be removed from the liquid MDA by filtration.

As shown in FIGURE 2 the dilute salt solution from separator 18 may, if desired, be further reduced in salt content by treatment with MDA solution in accordance with the teachings of our patent application Ser. No. 649,533, filed concurrently herewith and previously referred to hereinbefore. In such cases the dilute brine from separator 18, which contains approximately 12% by weight NaCl, is mixed with the solution of 18% by weight of MDA in a solvent such as acetone or methyl alcohol, etc. in the proportions of 6000 ml. of solution per liter of brine. The resulting slurry is transferred to separator 42 where the crystalline precipitate is removed, as by filtration. The precipitate is transferred to mixer 24 where it is combined with precipitate from separator 18 and resolved into its components as described above. The liquid phase from separator 42 which consists of treated brine and solvent is fractionated in distillation column 46. The solvent taken overhead is recovered and reused in the process. The treated brine from the bottom of distillation column 46 has a sodium chloride content of only about 0.5 to 1.5% by weight and if desired may be used for industrial purposes or further processed to produce potable water.

As mentioned hereinbefore, the process shown diagrammatically in FIGURE 1 also may be used for the removal of MDA-reacting salts from their concentrated solutions when present in association with nonreacting salts. The following example describes the selective removal of sodium chloride from potassium chloride when both are present in a concentrated aqueous solution.

A potash brine containing 7.6% by weight of potassium chloride and 16.0% by weight of sodium chloride is mixed with 500 grams of solid MDA per liter of brine in mixer 10 at a temperature of 70–75° C. A crystalline precipitate is formed in mixer 10 and the resulting slurry fed to separator 18 where the precipitate is removed, as by filtration. The aqueous phase is withdrawn from separator 18 as a less concentrated salt solution containing approximately 8.0% potassium chloride and 13.0% sodium chloride. Thus the mol ratio of KCl to NaCl is increased from 0.37:1 in the original potash brine to 0.49:1 in the treated brine. This treated brine may be used directly as the charge to conventional fractional crystallization equipment for the further separation of NaCl and KCl or it may be subjected to further treatment with a solution of MDA in accordance with the process of FIGURE 2. The precipitate composed mostly of sodium chloride and MDA obtained from separator 18 is resolved into its components in mixer 24 by the addition of 2-3 ml. of acetone per gram of precipitate and agitating at a temperature of about 50° C. The resulting slurry is transferred to separator 30 where salt is separated from MDA solution as by filtration. The composition of the salt is 79.9% by weight sodium chloride and 20.1% by weight potassium chloride, the potassium chloride content being due primarily to occulsion in the precipitate during the step of forming the precipitate in mixer 10. Some of the occluded potassium chloride may be removed from the precipitate by washing with cold water (50° C.) prior to resolution into its components in mixer 24. The washed precipitate contains 95% NaCl and 5% KCl.

Tests conducted with sodium chloride brines in accordance with the method of this application show that when concentrated brines are employed as the charge stock, the salt content is reduced to approximately 12% by weight regardless of the original concentration and provided it originally was in excess of 12%. Brines originally containing less than 12% are not susceptible of treatment with solid MDA in accordance with the teachings herein and if further reduction in content is desired, such reduction may be achieved by treating with MDA in a suitable organic solvent, such as acetone, methyl alcohol, etc., in accordance with the method of our application Ser. No. 649,533, filed concurrently herewith.

Obviously, many modifications and variations of the invention, as hereinbefore set forth, may be made without departing from the spirit and scope thereof, and therefore only such limitations should be imposed as are indicated in the appended claims.

We claim:

1. A process for recovering salt from an aqueous solution containing at least twelve percent by weight of said salt which comprises introducing solid 4,4'-methylenedianiline into said aqueous solution to react with said salt to form an insoluble precipitate in an aqueous solution of reduced salt content, removing said precipitate from said aqueous solution of reduced salt content, introducing an organic solvent for said 4,4'-methylenedianiline into said removed precipitate to resolve said precipitate into its components, said salt being selected from the group consisting of the chlorides, bromides, iodides and nitrites of sodium and lithium.

2. The process of claim 1 wherein said organic solvent is an aliphatic alcohol having a boiling point below the boiling point of water.

3. The process of claim 1 wherein said organic solvent is an aliphatic ketone having a boiling point below the boiling point of water.

4. A process for separating sodium and lithium salts from other inorganic salts in an aqueous solution containing more than twelve percent by weight of said sodium and lithium salts which comprises introducing solid 4,4'-methylenedianiline into said aqueous solution to react with said sodium and said lithium salts to form an insoluble precipitate in an aqueous solution having a reduced content of sodium and lithium salts, removing said precipitate from said aqueous solution of reduced salt content, said sodium and lithium salts being selected from the group consisting of the chlorides, bromides, iodides and nitrites of sodium and lithium.

5. The process of claim 4 wherein said removed precipitate is treated with a solvent for said 4,4'-methylenedianiline at a temperature in the range of 40° to 100° C. whereby said precipitate is resolved into its component parts.

6. A process for separating sodium and lithium salts from other inorganic salts in a first aqueous solution containing more than twelve percent by weight of said sodium and lithium salts which comprises reacting a portion of said sodium and lithium salts with solid 4,4'-methylenedianiline to produce a first crystalline precipitate in a second aqueous solution having a reduced content of sodium and lithium salts, removing said precipitate from said second solution, reacting said sodium and lithium salts in said second solution with 4,4'-methylenedianiline dissolved in an organic solvent to produce a second crystalline precipitate in a third aqueous solution of further reduced content of sodium and lithium salts removing said second precipitate from said third solution, said sodium and lithium salts being selected from the group consisting of the chlorides, bromides, iodides and nitrites of sodium and lithium.

7. The process of claim 6 including the step of introducing an organic solvent for said 4,4'-methylenedianiline into said first removed precipitate and said second removed precipitate to resolve said precipitates into their components.

References Cited

UNITED STATES PATENTS

| 3,268,290 | 8/1966 | Gaska et al. | 23—89 |
| 3,306,712 | 2/1967 | Goodenough | 23—312 |
| 3,307,922 | 3/1967 | Goodenough et al. | 23—89 XR |

OTHER REFERENCES

J. Amer. Chem. Soc., vol. 88, pp. 1076–1077 (1966).

EDWARD STERN, *Primary Examiner.*

U.S. Cl. X.R.

23—104, 312